April 8, 1930.  P. SCHOLTUS  1,753,388
TIRE CHAIN
Filed March 19, 1928  2 Sheets-Sheet 1
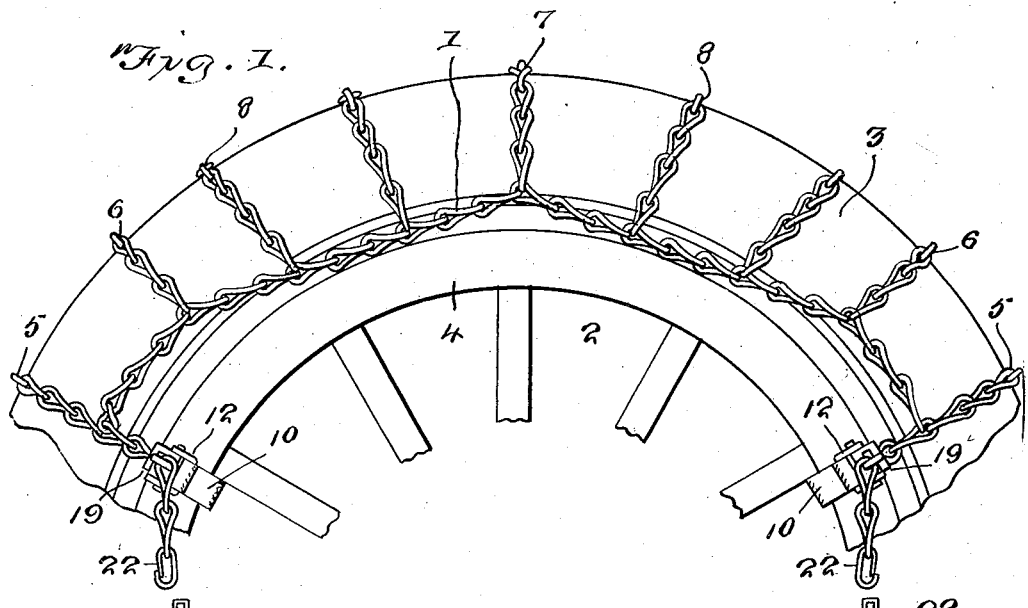
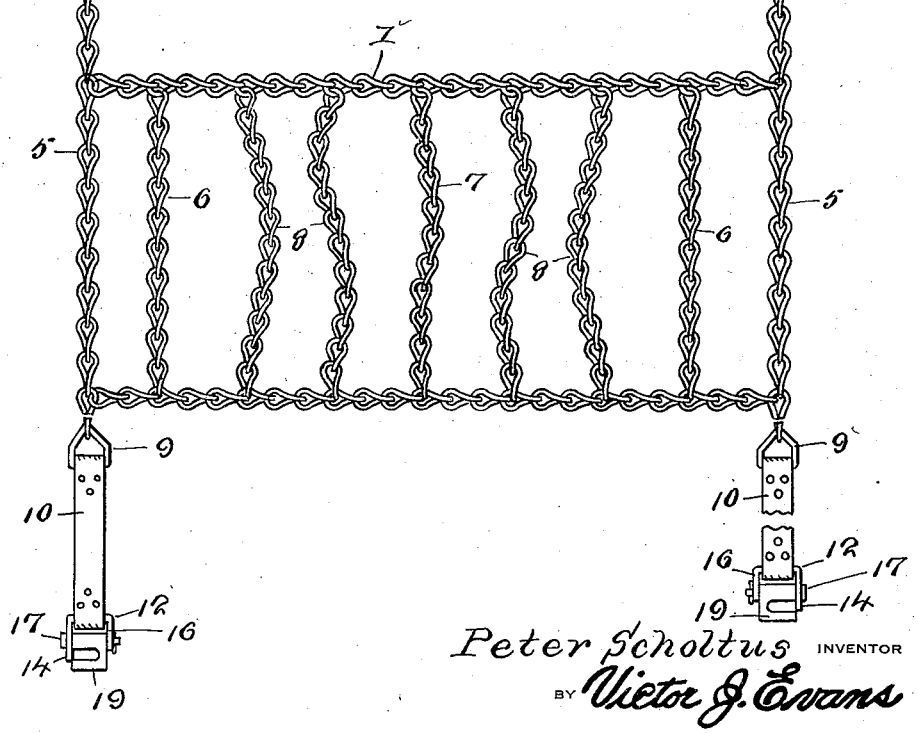
Peter Scholtus INVENTOR
BY Victor J. Evans ATTORNEY April 8, 1930.  P. SCHOLTUS  1,753,388
TIRE CHAIN
Filed March 19, 1928   2 Sheets-Sheet 2
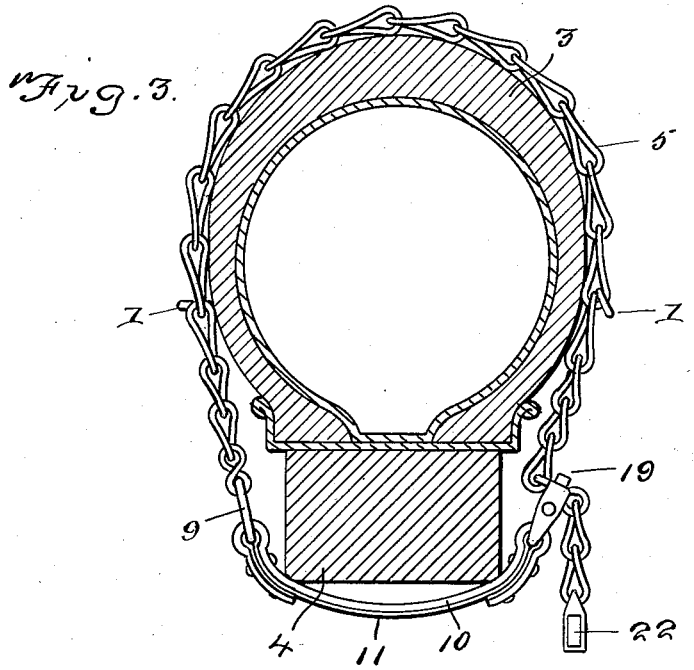
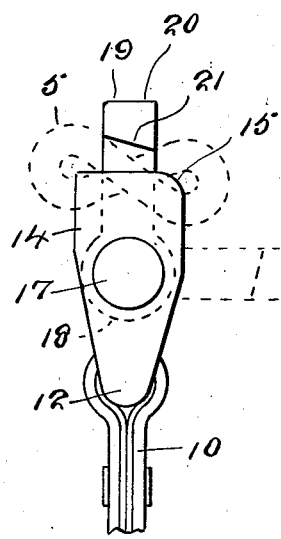
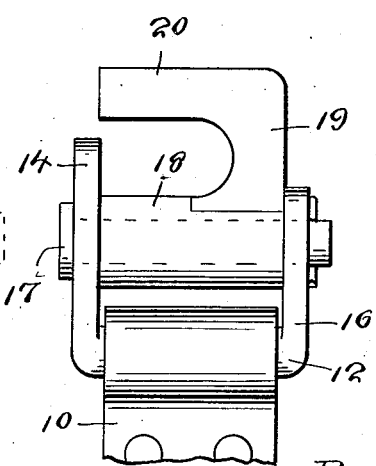
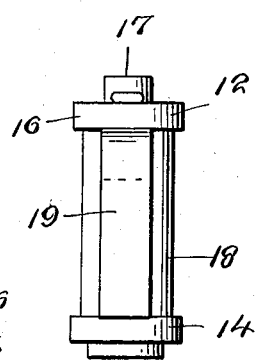
Peter Scholtus
INVENTOR
BY Victor J. Evans
ATTORNEY Patented Apr. 8, 1930

1,753,388

UNITED STATES PATENT OFFICE

PETER SCHOLTUS, OF DETROIT, MICHIGAN

TIRE CHAIN

Application filed March 19, 1928. Serial No. 262,670.

My present invention has reference to what I will term a mud chain for the wheels of automobiles or other vehicles.

My object is the provision of a simple and cheaply constructed device which may be readily applied to a portion of an automobile or like tire, and as readily removed therefrom and which will increase the traction to an extent as to extricate the wheel when mired in a ground surface or when a wheel is caught in declivities, etc.

In carrying out my invention it is my intention to provide a mud chain which is made up of side chains, cross or traction chains and tire chains which have certain of their links connected to the end links of the side chains, and whose ends are designed to be arranged around a wheel tire and felly and fastened thereto by a novel catch construction. The traction portions of the tire chain and the end cross chains are of the same length and have a firm biting engagement with the tire. The central cross chain is of a slightly greater length but also has a biting engagement with the tire while the remaining cross chains are of a greater length and are loosely arranged over the tire so that they will curve or arch themselves when brought against a ground surface and bite thereinto a greater length than the first named cross chains with the result that the ground is contacted at different points or angles by the traction chains and a mired wheel, upon the turning thereof will be thereby readily extricated.

For a full and comprehensive understanding reference is to be had to the accompanying drawings which form a part of this application and wherein a satisfactory embodiment of the improvement is illustrated.

In the drawings:

Figure 1 is a view of a sufficient portion of an automobile wheel to illustrate the application of my improvement thereon.

Figure 2 is a plan view of the improvement.

Figure 3 is a transverse sectional view through the tire and felly of the wheel looking toward one end of the improvement.

Figure 4 is an end view of the fastener for one of the tire chains.

Figure 5 is a face view thereof.

Figure 6 is a top plan view thereof.

The links constituting the chains of the improvement may be square or twisted and have their ends welded together. The improvement includes side chains 1. Each of these chains is of a length, in the showing of the drawings approximately equaling the length between five of the spokes of an automobile or like vehicle wheel 2. The side chains are, of course, arranged against the sides of the tire 3 for the wheel 2 and adjacent to the rim in which the tire is seated. For distinction the felly of the wheel is indicated by the numeral 4.

The side chains 1 have their end links connected to what I will term tire chains 5. The portion of the tire chains, connected to the side chains afford tread or traction chains. There is also connected to the links of the side chains 1 other cross or traction chains. For distinction the cross or traction chains next to the tire chains will be termed the end cross chains and are indicated by the numeral 6. The end cross chains are of a length equaling the traction portions of the tire chains 5, being made up of the same number of links. The central cross chain is indicated for distinction by the numeral 7, and this cross chain is of a slightly greater length than the end chains 6 and, of course, the traction portions of the end chains 5, the said central chain having one more link than the first mentioned chains. Between the central chain and the end chains there are pairs of intermediate chains 8, respectively. These chains are of a greater length than the chains 7 and 6, and the traction portions of the tire chains 5. In the showing of the drawings, the traction portions of the chains 5 and the end chains 6 are made up of ten links, the central chain of eleven links, and the remaining chains 8 of twelve links. The purpose for this arrangement will be presently understood and appreciated.

One of each of the tire chains has its link that is connected with the end links of the side chains attached, preferably through the medium of a bail 9 to a strap 10. The strap is preferably formed of a piece of brake lining but has its outer face covered by a comparatively thin metal sheet 11 which is riveted or otherwise secured thereto. Obviously the element 10 need not be constructed as above described, and may in fact provide a continuation of the tire chains. In the showing of the drawings, the outer looped portion of the strap 10 has secured thereto a U-shaped member or bail 12. By reference especially to Figure 5 of the drawings it will be seen that one of the parallel arms of the U-shaped member or bail is of a greater length than the other arm. The longer arm is indicated for distinction by the numeral 14, and the outer corner thereof is rounded, as at 15. Also for distinction the shorter arm is indicated by the numeral 16. Passing through alining openings through the arms 14 and 16 there is the removable pivot 17 for the inner or barrel portion 18 of a flat hook 19. The hook has its outer straight element or beak 20 arranged parallel with the barrel 18 and the inner wall provided by this portion or beak 20 of the hook is beveled as disclosed by Figure 4 of the drawings and indicated by the numeral 21. The hook and U-shaped mount or support therefor constitutes the fastening of the ends of the tire chains 5. The tire chains 5 have their links extended beyond the second side chain 1 and the outer links of these extensions have each attached thereto a snap hook 22. When the device is arranged upon a tire and secured to the wheel, as illustrated in Figures 1 and 3 of the drawings, the hook 19 is first swung to the position indicated by the dotted lines in Figure 4 so that one of the links of the tire chains 5 can be received over the rounded corner of the arm 14 and within the bail 12. The hook is then swung to the position illustrated in Figure 4 of the drawings, and by reference to this figure and the dotted line position of the link engaged by the hook it will be seen that the corners provided by the beveled inner face of the beak of the hook will have biting engagement with the link, and the tighter the pull of the link against the hook the more effectively the same will engage with the link. The swinging of the link on the pivot 17 will readily release the link.

When the improvement is arranged on the tire the traction portions of the tire chains 5 and the end cross chains 6 will be brought into tight frictional engagement with the tire, and the central cross chain 7 will also engage with the tire but with less friction than that exerted by the end chains 6 and the traction portions of the tire chains 5, while what may be termed the intermediate links 8 will be loosely disposed over the tire. The result is that when the wheel is caused to turn the cross or traction chains of the improvement will contact with the ground surface at different angles, the traction portions of the tire chains 5 and the end chains 6 contacting the said ground surface at a right angle with respect to the longitudinal plane of the wheel or tire, and the central chain 7 will be slightly curved but will be brought into firm biting engagement with the tire, while the intermediate chains 8 will curve or arch themselves in their biting engagement with the ground surface, with the result that the ground surface being contacted at different points or angles, the cross chains of the improvement will afford an ample traction for the wheel to permit of the same being readily extricated from sand, mud, declivities, ruts and the like.

The biting engagement of the end of the traction portions of the tire chains, together with the biting engagement of the central chain with the tire will prevent the longitudinal movement of the improvement on said tire. Such movement also is prevented by the contacting engagement of the fastening means with the opposite faces of the spokes of the wheel, as clearly indicated by Figure 1 of the drawings. The snap hooks 22 are employed for taking up any slack between the fasteners and the tire chains, the said snap hooks being designed to be snapped against the links of either the tire chains or the side chains and thereby prevent the contact of the extended portions of the tire chains with the mud guards of the vehicle.

I have in the foregoing description set forth a satisfactory embodiment of the improvement as the same now appears to me, but in the manufacture of my device I may make slight changes from the devices herein set forth. Therefore, I desire it to be understood that I do not wish to be restricted to the precise details of construction herein recited and hold myself entitled to make such changes therefrom as fairly fall within the scope of what I claim.

While preferably the cross chains are of the same length it is obvious that I may employ links of different thicknesses and perhaps of greater durability than those disclosed by the drawings and also I hold myself entitled to make other slight changes from the disclosure as fairly fall within the scope of what I claim.

Having described the invention, I claim:

In a mud chain for a vehicle wheel with means for securing the chain thereto, said chain comprising side chains, cross chains secured to the ends of the side chains, equi-distantly spaced cross chains having their ends secured to the side chains between the cross chains first mentioned, the outermost chains of those second mentioned being of similar length, the intermediate cross chain being of a slightly greater length than the outermost cross chains of those second mentioned, the remaining cross chains being arranged in pairs of the same length but of a greater length than the other cross chains, and the pairs of said remaining cross chains being disposed upon opposite sides of the intermediate cross chain.

In testimony whereof I affix my signature.

PETER SCHOLTUS.